Feb. 18, 1969      A. D. BERRY      3,428,827
HIGH AND LOW VOLTAGE LEVEL THRESHOLD CIRCUIT EMPLOYING
TWO DIFFERENTIAL AMPLIFIER COMPARATORS
Filed July 1, 1965

INVENTOR
ALLAN DAVID BERRY
BY Kirschstein, Kirschstein & Ottinger
ATTORNEYS

United States Patent Office 3,428,827
Patented Feb. 18, 1969

3,428,827
HIGH AND LOW VOLTAGE LEVEL THRESHOLD CIRCUIT EMPLOYING TWO DIFFERENTIAL AMPLIFIER COMPARATORS
Allan David Berry, Coventry, England, assignor to The General Electric Company Limited, London, England
Filed July 1, 1965, Ser. No. 468,865
Claims priority, application Great Britain, July 3, 1964, 27,552/64
U.S. Cl. 307—235  6 Claims
Int. Cl. H03k 5/20

ABSTRACT OF THE DISCLOSURE

A high and low voltage threshold circuit comprising first and second emitter-coupled pairs of transistors, the inter-connected emitter electrodes of the second pair being connected to the collector electrode of one of the first pair of transistors, the first pair of transistors being connected to compare a portion of an input signal voltage with a first reference voltage, the second pair of transistors being connected to compare said input signal voltage with a second reference voltage, and the output of the circuit being derived from an electromagnetic relay that is responsive to current flow in the collector circuit of one of the second pair of transistors.

---

Figure 1:
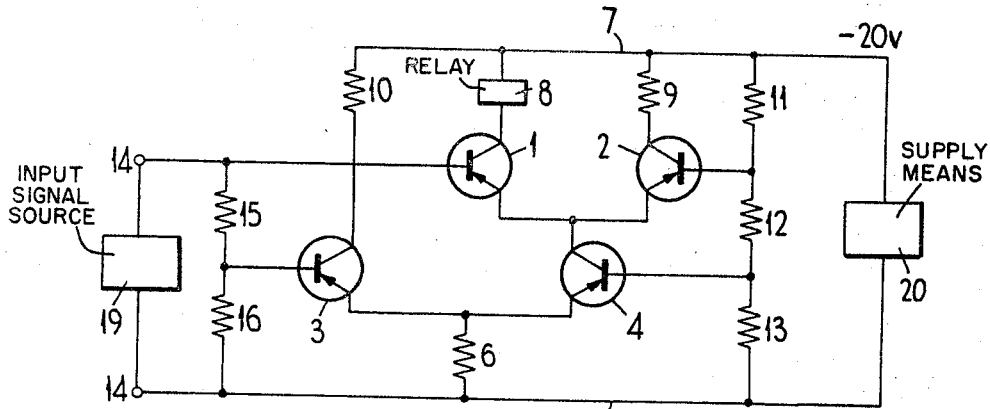

This invention relates to electric circuit arrangements employing transistors.

More particularly this invention relates to electric circuit arrangements employing transistors, that are responsive to whether the level of an input signal which is supplied thereto is or is not within a predetermined range of values.

It is often necessary in electrical apparatus to provide an alarm by means of an indicator, for example a relay, if the level of an input signal increases or decreases by more than a desired amount from its normal value.

The relay may be arranged in either of two ways. It may be arranged such that if the level of the input signal is between two predetermined values, hereafter called the low and high alarm points, the relay is energised, but if the level of the input signal is not between these two values the relay is inert, or it may be arranged such that the relay is inert if the the input signal is between the two stated values and energised if it is not. The first of these arrangements is a "fail safe" arrangement, that is if the supply voltage to the relay fails the relay would indicate an alarm condition, and the second of these arrangements is a "fail dangerous" arrangement, that is if the supply voltage to the relay fails the relay would indicate a normal condition regardless of the level of the input signal.

In practice, due to residual magnetism in the relay, the state of the relay when the level of the input signal is at either the low or high alarm point depends upon whether the level of the input signal has risen or fallen to that point, i.e., in a "fail safe" arrangement if the level of the input signal has risen to the low alarm point or fallen to the high alarm point the relay is inert at these points, but if it has fallen to the low alarm point or risen to the high alarm point the relay is energised at these points. In a "fail dangerous" arrangement the state of the relay at the low and high alarm points would be opposite to that stated above for the conditions stated above.

This effect of the residual magnetism in the relay is useful in that it prevents the relay "chattering" in the event of the level of the input signal being at either the low or high alarm point.

Known circuit arrangements designed to provide the above described alarm indications suffer from a number of disadvantages some of which are as follows. If the level of the input signal increases to a value which is much greater than that of the high alarm point the relay may become wrongly energised, thus giving, in a "fail safe" arrangement, a wrong indication, and further, the variations in the level of the input signal may cause unduly large variations in the current in the relay and/or in the current drawn from the supply, both of which effects are undesirable. A further disadvantage of known circuits is that if they have a low input impedance compared with the source impedance of the input signal, this causes the measured values of the low and high alarm points to be too dependent upon the circuit component characteristics.

An object of the present invention is to provide an electric circuit arrangement of the type specified which overcomes to a substantial degree the above stated disadvantages.

A further object of the present invention is to provide an electric circuit arrangement of the type specified utilising a small number of components, especially semiconductor devices, and which requires only a small supply of current for operation.

According to the present invention an electric circuit arrangement that is responsive to the level of an input signal comprises a pair of input terminals, first, second, third and fourth transistors each having a control electrode and first and second further electrodes, the first and second transistors being connected with a resistive element in a common circuit of the first further electrodes of both transistors to form a first comparison circuit, and the third and fourth transistors being connected with the path between the first and second further electrodes of one of the transistors of the first comparison circuit in a common circuit of the first further electrodes of the third and fourth transistors to form a second comparison circuit, means to supply potentials to the control electrodes of the first and third transistors that are dependent upon the level of the input signal supplied to the input terminals, means to supply bias potentials to the control electrodes of the second and fourth transistors, and means responsive to the flow of current through one of the transistors of the second comparison circuit, the arrangement being such that the last mentioned means only responds when the level of the input signal falls within a predetermined range of values.

Three "fail safe" circuit arrangements in accordance with the present invention will now be described by way of example with reference to the accompanying drawing in which each of the three figures shows one of the arrangements.

Throughout the figures the same reference numerals have been used for similar components wherever possible.

It is assumed that the signal in the level of which the interest lies may readily be converted to a unidirectional potential difference of suitable amplitude, if it is not already in that form, and this unidirectional potential difference will hereafter be referred to as the input signal.

Referring now to FIGURE 1, the circuit includes four p-n-p junction transistors 1, 2, 3 and 4. The emitter electrodes of the transistors 1 and 2 are directly connected together, and are also connected to the collector electrode of the transistor 4. The emitter electrodes of the transistors 3 and 4 are directly connected together and are connected to a positive supply line 5 by way of a resistor 6. The collector electrode of the transistor 1 is connected to a negative supply line 7 by way of the operating winding of a relay 8, and the collector electrodes of the transistors 2 and 3 are connected to the line 7 by way of resistors 9 and 10, respectively. Bias voltages are applied to the base electrodes of the transistors 2 and 4 by way of a potential divider network comprising the resistors 11, 12 and 13, connected between the supply lines 5 and 7.

The input signal from a source 19 is supplied to the base electrode of the transistor 1 by way of the input terminals 14, and half of the input signal potential difference is also supplied to the base electrode of the transistor 3 by way of the potential divider comprising the resistors 15 and 16.

The line 7 is maintained at a potential of −20 volts with respect to the line 5 by supply means 20.

The operation of the circuit is as follows.

The transistors 1 and 2 function as a comparison circuit which operates to compare the level of the input signal with a reference potential from the junction between the resistors 11 and 12, and the transistors 3 and 4 function as a further comparison circuit which operates to compare half of the poential of the input signal with a reference potential from the junction between the resistors 12 and 13.

The values of the resistors 6, 11, 12 and 13 are chosen such that when the level of the input signal is below the required low alarm point the biases applied to the transistors 1, 2, 3 and 4 are such that the transistors 1 and 3 are nonconducting while the transistors 2 and 4 are conducting.

Current then flows from the line 5 to the line 7 by way of the resistor 6, the emitter-collector paths of the transistors 4 and 2, and the resistor 9.

As the transistor 1 is nonconducting no current is supplied to the relay 8 and it is inert.

If the level of the input signal rises to a value which is above the required low alarm point, the transistor 1 becomes so biased that it becomes conducting thus causing the transistor 2 to become non-conducting due to the connections between them.

Current now flows from the line 5 to the line 7 by way of the resistor 6, the emitter-collector paths of the transistors 4 and 1, and the relay 8.

Thus, current is supplided to the relay 8 and it is operated.

If the level of the input signal rises to a value which is above the required high alarm point, the bias applied to the base electrode of the transistor 3 causes this transistor to become conducting thus causing the transistor 4 to become nonconducting due to the connections between them.

Current now flows from the line 5 to the line 7 by way of the resistor 6, the emitter-collector path of the transistor 3, and the resistor 10.

Thus no current is supplied to the relay 8 and it becomes inert.

The value of the resistor 10 is chosen such that the transistor 3 is caused to bottom when the level of the input signal is above the required high alarm point thus limiting the current which is drawn from the line 5.

The value of the resistor 9 is chosen so as to safely limit the power dissipated in the emitter-collector path of the transistor 2 when the input signal is below the low alarm point.

The three conditions of the circuit are thus as follows. When the level of the input signal is between the low and high alarm points the transistors 1 and 4 are conducting and the relay 8 is operated. When the level of the input signal is below the low alarm point the transistors 2 and 4 are conducting, the transistors 1 and 3 are nonconducting, and the relay is inert, and when the level of the input signal is above the high alarm point the transistor 3 is conducting, the transistors 2 and 4 and 1 are nonconducting, and the relay is again inert.

If the potential supply to the lines 5 and 7 should fail, the relay 8 becomes inert thus indicating an alarm condition, the arrangement being therefore "fail safe."

Figure 2:
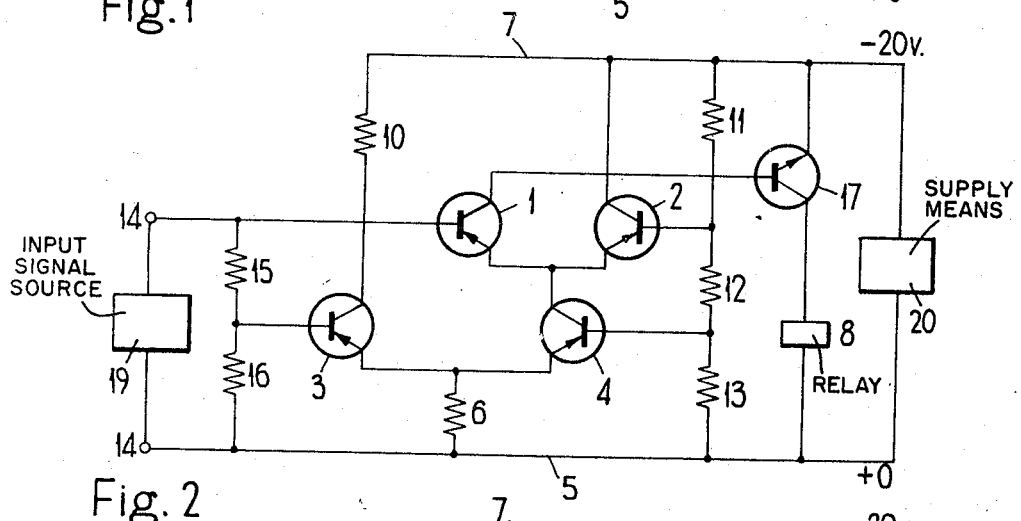

Referring now to FIGURE 2, the circuit shown here is arranged and operates similarly to the one shown in FIGURE 1 with the exceptions that the relay 8 is energised indirectly from the collector electrode of the transistor 1 by way of an n-p-n junction transistor 17 which is connected with its emitter-collector path in series with the relay 8 between the lines 5 and 7, and that the collector electrode resistor (9 on FIGURE 1) of the transistor 2 is omitted.

With this arrangement the current required to operate the relay 8 is less than that required for the arrangement shown in FIGURE 1 because there is more voltage available to operate it. This is possible with this arrangement as the transistor 17 is deliberately bottomed when the relay 8 is energised whereas with the arrangement of FIGURE 1 it is necessary to ensure that the voltage across the relay 8 when it is energised is not such that the transistor 1 becomes bottomed.

A further advantage of the arrangement shown in FIGURE 2 is that because of the current amplification provided by the transistor 17, the current that is required from the collector electrode of the transistor 4 may be appreciably less than is required with the arrangement of FIGURE 1 and hence the value of the resistor 6 may be large, giving the arrangement a higher input impedance than that of FIGURE 1.

It is because the high value of the resistor 6 limits the current which flows in the emitter-collector paths of the transistors 1, 2 and 4 that the collector electrode resistor (9 on FIGURE 1) of the transistor 2 may be omitted.

Another advantage of the arrangement shown in FIGURE 2 is that when the relay becomes inert, i.e., under alarm conditions, the total current consumption of the arrangement drops.

In order to avoid incorrect operation at high ambient temperatures the transistors 1, 2, 3 and 4 of FIGURE 2 should preferably be silicon transistors, with low leakage currents.

Figure 3:
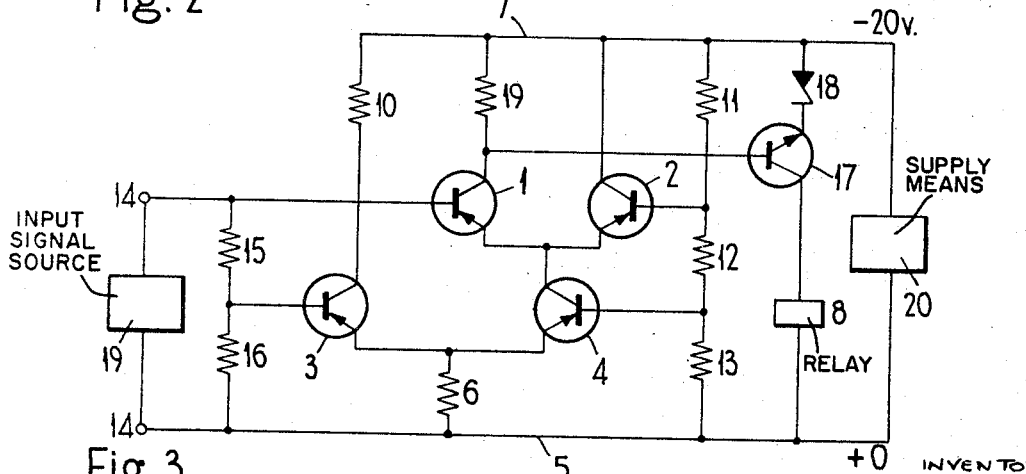

Referring now to FIGURE 3, the circuit shown here is arranged and operates similarly to the one shown in FIGURE 2 with the exceptions that a Zener diode 18 is connected between the emitter electrode of the transistor 17 and the line 7, and a resistor 19 is connected between the collector electrode of the transistor 1 and the line 7.

With this arrangement the transistor 1, 2, 3 and 4 may be germanium transistors, since any leakage current in the collector circuit of the transistor 1 will give rise to a voltage across the resistor 19 which is insufficient to break down the Zener diode 18.

When the level of the input signal is between the required low and high alarm points, however, the current flowing in the resistor 19 will set up a voltage across it which is sufficient to break down the Zener diode 18 so that the relay 8 will operate as required.

The resistor 10 may be omitted from the arrangements shown in FIGURES 2 and 3, since the current drawn by the transistor 3 when the level of the input signal is above the high alarm point is much smaller than is the case with the arrangement of FIGURE 1, and moreover any excess of current over the normal operating current is more than offset by the reduction of the current in the relay 8 under such an alarm condition.

I claim:

1. An electric circuit arrangement that is responsive to the level of an input signal comprising a pair of input terminals, first, second, third and fourth transistors each having a control electrode and first and second further electrodes, the first and second transistors being connected with a resistive element in a common circuit of of the first further electrodes of both transistors to form a first comparison circuit, and the third and fourth transistors being connected with the path between the first and second further electrodes of one of the transistors of the first comparison circuit in a common circuit of the first further electrodes of both transistors to form a second comparison circuit, means to supply potentials to the control electrodes of the first and third transistors that are dependent upon the level of the input signal supplied to the input terminals, means to supply bias potentials to the control electrodes of the second and fourth transistors, and means reponsive to the flow of current through one of the transistors of the second comparison circuit, the arrangement being such that the last mentioned means only responds when the level of the input signal falls within a predetermined range of values.

2. An electric circuit arrangement that is responsive to the level of an input signal comprising a pair of supply lines, means to maintain a unidirectional potential difference between said supply lines, a first pair of transistors and a second pair of transistors each of said transistors having a control electrode and first and second further electrodes, means connecting the first further electrodes of said first pair of transistors together and by way of a resistive element to one of said supply lines, means connecting the first further electrodes of said second pair of transistors together and to the second further electrode of one of said first pair of transistors, means to supply bias potential to the control electrode of one of said first pair of transistors and to the control electrode of one of said second pair of transistors, a pair of input terminals, means connecting one of said input terminals to the control electrode of the other of said first pair of transistors and to the control electrode of the other of said second pair of transistors, means connecting the other input terminal to one of said supply lines, and means responsive to current flow through one of said second pair of transistors, the arrangement being such that the last-mentioned means only responds when the level of the input signal falls within a predetermined range of values.

3. An electric circuit arrangement in accordance with claim 1 wherein said transistors are junction transistors, and said control electrodes are base electrodes and said first and second further electrodes are respectively emitter and collector electrodes.

4. An electric circuit arrangement in accordance with claim 3 wherein said means responsive to current flow comprises an electromagnetic relay an operating winding of which is connected in series with the emitter-collector path of the respective transistor.

5. An electric circuit arrangement in accordance with claim 3 wherein said means responsive to current flow comprises a further junction transistor, having emitter, base and collector electrodes, and an electromagnetic relay, the base electrode of said further transistor being connected to the collector electrode of the respective transistor so as to receive at least part of said current flow and an operating winding of said relay being connected in series with the emitter-collector path of said further transistor.

6. An electric circuit arrangement in accordance with claim 5 wherein a Zener diode is connected in the base-emitter circuit of said further transistor such that in operation said further transistor is substantially conductive only when said current flow exceeds a predetermined minimum value.

References Cited

UNITED STATES PATENTS

| | | | |
|---|---|---|---|
| 2,892,940 | 6/1959 | Ogletree | 328—146 |
| 3,077,566 | 2/1963 | Vosteen | 330—30 |
| 3,168,709 | 2/1965 | Sikorra | 330—30 |
| 3,178,698 | 4/1965 | Graham | 307—235 X |
| 3,316,423 | 4/1967 | Hull | 328—148 X |

JOHN S. HEYMAN, *Primary Examiner.*

U.S. Cl. X.R.

307—230, 313, 318